US008238971B2

(12) United States Patent
Terlizzi (10) Patent No.: US 8,238,971 B2
(45) Date of Patent: Aug. 7, 2012

(54) ACCESSORY DETECTION TO MINIMIZE INTERFERENCE WITH WIRELESS COMMUNICATION

(75) Inventor: Jeffrey J. Terlizzi, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 622 days.

(21) Appl. No.: 11/618,229

(22) Filed: Dec. 29, 2006

(65) Prior Publication Data
US 2007/0123207 A1 May 31, 2007

(51) Int. Cl.
*H04B 1/38* (2006.01)
*H04B 15/00* (2006.01)
*H04M 1/21* (2006.01)
*H04M 1/00* (2006.01)

(52) U.S. Cl. .............. 455/557; 455/556.1; 455/575.1; 455/63.1

(58) Field of Classification Search .......... 726/26–34; 455/63.1, 114.2, 278.1, 296, 556.1–557, 455/575.1–575.9
See application file for complete search history.

(56) References Cited

U.S. PATENT DOCUMENTS

| | | | | | |
|---|---|---|---|---|---|
| 5,333,177 | A | * | 7/1994 | Braitberg et al. | 455/559 |
| 5,479,479 | A | * | 12/1995 | Braitberg et al. | 455/404.1 |
| 5,905,859 | A | * | 5/1999 | Holloway et al. | 726/22 |
| 5,943,021 | A | | 8/1999 | Hayes et al. | |
| 6,169,888 | B1 | * | 1/2001 | Lindenmeier et al. | 455/277.2 |
| 6,523,124 | B1 | * | 2/2003 | Lunsford et al. | 713/320 |
| 7,296,107 | B2 | * | 11/2007 | Lunsford et al. | 710/304 |
| 7,305,254 | B2 | * | 12/2007 | Findikli | 455/557 |
| 7,327,697 | B1 | * | 2/2008 | Friday et al. | 370/278 |
| 7,836,216 | B2 | * | 11/2010 | Kashi et al. | 710/15 |
| 2001/0055978 | A1 | * | 12/2001 | Herrod et al. | 455/517 |
| 2004/0028003 | A1 | * | 2/2004 | Diener et al. | 370/319 |
| 2004/0066595 | A1 | * | 4/2004 | Tignor et al. | 361/93.1 |
| 2004/0204081 | A1 | * | 10/2004 | Kim | 455/557 |
| 2006/0223579 | A1 | * | 10/2006 | Whitaker et al. | 455/557 |
| 2006/0223581 | A1 | * | 10/2006 | Jacobs et al. | 455/557 |
| 2007/0099593 | A1 | * | 5/2007 | Thome et al. | 455/349 |
| 2007/0248328 | A1 | * | 10/2007 | Khan et al. | 386/96 |
| 2007/0298717 | A1 | * | 12/2007 | Palin et al. | 455/63.1 |
| 2009/0191914 | A1 | * | 7/2009 | Stahl | 455/557 |

FOREIGN PATENT DOCUMENTS

JP 2004/242006 A 8/2004
JP 2004242006 A * 8/2004

OTHER PUBLICATIONS

Machine Translation of JP 2004/242006A retrieved Sep. 15, 2009 from the JPO website.*
Machine Translation of a Non-English Document Being Relied Upon by the Examiner in Support of a Rejection in an Examiner's Answer (signed Nov. 17, 2009) by Andrew H. Hirshfeld, Acting Associate Commissioner for Patent Examination Policy.*
International Search Report PCT/US2007/088916 dated Dec. 15, 2008.
International Search Report PCT/US2007/088916 dated Jun. 2, 2008.

* cited by examiner

*Primary Examiner* — Matthew Sams
(74) *Attorney, Agent, or Firm* — Kilpatrick Townsend & Stockton LLP (57) ABSTRACT

A wireless handheld device includes one or more antennas and a connector configured to couple with one or more external accessories. The handheld device further includes an accessory detector coupled to the connector and configured to detect whether an external accessory coupled to the connector may interfere with wireless communication with the handheld device.

37 Claims, 4 Drawing Sheets

| Pin | Signal Name | I/O | Function |
| --- | --- | --- | --- |
| 1 | DGND | GND | Digital ground in mobile device. |
| 2 | DGND | GND | Digital ground in mobile device. |
| 3 | TPA+ | I/O | FireWire signal |
| 4 | USB D+ | I/O | USB signal |
| 5 | TPA- | I/O | FireWire signal |
| 6 | USB D- | I/O | USB signal |
| 7 | TPB+ | I/O | FireWire signal |
| 8 | USB Vbus | I | USB power in; used to detect a USB host. |
| 9 | TPB- | I/O | FireWire signal |
| 10 | Accessory Identify | I | Identify external accessory |
| 11 | F/W PWR+ | I | FireWire and charger input power (8 V to 15 V DC) |
| 12 | F/W PWR+ | I | FireWire and charger input power (8 V to 15 DC) |
| 13 | Accessory Power | O | 3.3 V is the nominal output. Nominal current in low power mode is 5 mA, with current limited to 100 mA in high power mode. |
| 14 | Reserved | | |
| 15 | DGND | GND | Digital ground in mobile device. |
| 16 | DGND | GND | Digital ground in mobile device. |
| 17 | Reserved | | |
| 18 | RX | I | Receive data |
| 19 | TX | O | Transmit data |
| 20 | Accessory Detect | I | Accessory Detect |
| 21 | S Video Y | O | Luminance component of S video. |
| 22 | S Video C | O | Chrominance component of S video. |
| 23 | Composite Video | O | Composite signal |
| 24 | Remote Sense | I | Detect remote |
| 25 | LINE-IN L | I | Line level input to the mobile device for the left channel. |
| 26 | LINE-IN R | I | Line level input to the mobile device for the right channel. |
| 27 | LINE-OUT L | O | Line level output to the mobile device for the left channel. |
| 28 | LINE-OUT R | O | Line level output to the mobile device for the right channel. |
| 29 | Audio Return | — | Audio return. This is a signal and should never be grounded inside the accessory. |
| 30 | DGND | GND | Digital ground in mobile device. |
| 31 | Chassis | | Chassis ground for connector shell. |
| 32 | Chassis | | Chassis ground for connector shell. |

*FIG. 6*

ACCESSORY DETECTION TO MINIMIZE INTERFERENCE WITH WIRELESS COMMUNICATION

BACKGROUND OF THE INVENTION

The present invention relates in general to wireless mobile devices, and more particularly to techniques for ensuring integrity of wireless communication with a wireless mobile device.

Today's wireless mobile devices incorporate sensitive circuitry and one or more antennas designed to maximize the transmission throughput and bandwidth. These onboard sensitive circuitry and antenna(s) are susceptible to various types of electromagnetic interferences. For example, when external accessories are coupled to a wireless mobile device, they can interfere with the operation of the onboard electronics thus impairing the wireless capabilities of the mobile device. This is undesirable particularly in situations where a handheld device user wishes to have wireless connection available while an accessory is connected to the mobile device.

Also, in an effort to minimize human exposure to radio frequency (RF) energy emitted by wireless mobile devices, some handset manufacturers have moved the antenna to a region of the wireless device that is farthest from the head of a user. In wireless handheld devices such as cellular phones, this often means placing the antenna at the base of the handset instead of near the top as is traditionally done. It is also desirable to house the connector (which serves as the interface for power and data transmission) at the base of the mobile device to enable docking the device in a docking system. However, with the antenna and the connector in close proximity at the base of the mobile device, the potential for RF interference from an external accessory coupled to the connector becomes even greater.

While mobile device manufacturers take steps in the design of both the mobile device and its accessories to ensure that the accessories do not adversely impact the wireless performance of the mobile device, there remain many other accessories including older versions of the manufacturers' own accessories, as well as after-market accessories, that may adversely impact the wireless performance of the mobile device.

Thus, there is a need for techniques that ensure the integrity of the wireless communication with a mobile device when an accessory is coupled with the mobile device.

BRIEF SUMMARY OF THE INVENTION

In accordance with an embodiment of the invention, a wireless handheld device includes one or more antennas and a connector configured to couple with one or more external accessories. The handheld device further includes an accessory detector coupled to the connector and configured to detect whether an external accessory coupled to the connector may interfere with wireless communication with the handheld device.

In one embodiment, the accessory detector is further configured to alert a user if the accessory detector detects that an external accessory coupled with the connector may interfere with the RF performance of the handheld device. In one embodiment, the handheld device alerts the user by displaying a corresponding message on a display, and in another embodiment, the handheld device alerts the user by generating an audio message.

In yet another embodiment, if the accessory detector cannot recognize an external accessory coupled to the connector, the handheld device notifies the user that the external accessory may interfere with wireless communication with the handheld device.

In still another embodiment, the accessory detector adjusts a radio characteristic of the handheld electronic device if the accessory detector detects interference with the RF performance of the handheld device. In one embodiment, the handheld device tunes the one or more antennas if the accessory detector detects interference with the operation of the one or more antennas. In another embodiment, the handheld device adjusts an operating frequency of the handheld device if the accessory detector detects an operating frequency of the handheld device has shifted out of a predetermined operating frequency range.

Further features of the invention, its nature and various advantages will be more apparent from the accompanying drawings and the following detailed description of embodiments of the invention.

BRIEF DESCRIPTION OF THE DRAWINGS

FIG. 6 shows the pin assignment for a unitary 30 pin connector capable of interfacing with a variety of external accessories.

DETAILED DESCRIPTION OF THE INVENTION

In accordance with an embodiment of the invention, a wireless mobile device has one or more antennas, a connector, and an accessory detector configured to detect whether an external accessory coupled to the connector may interfere with the RF performance of the handheld device. In one embodiment, the accessory detector alerts a user if the accessory detector detects that an external accessory coupled with the connector may interfere with wireless communication with the handheld device. In another embodiment, the accessory detector adjusts a radio characteristic of the handheld electronic device if the accessory detector detects interference with wireless communication with the handheld device. These and other embodiments of the invention will be described more fully using FIGS. 1-5.

Figure 1:
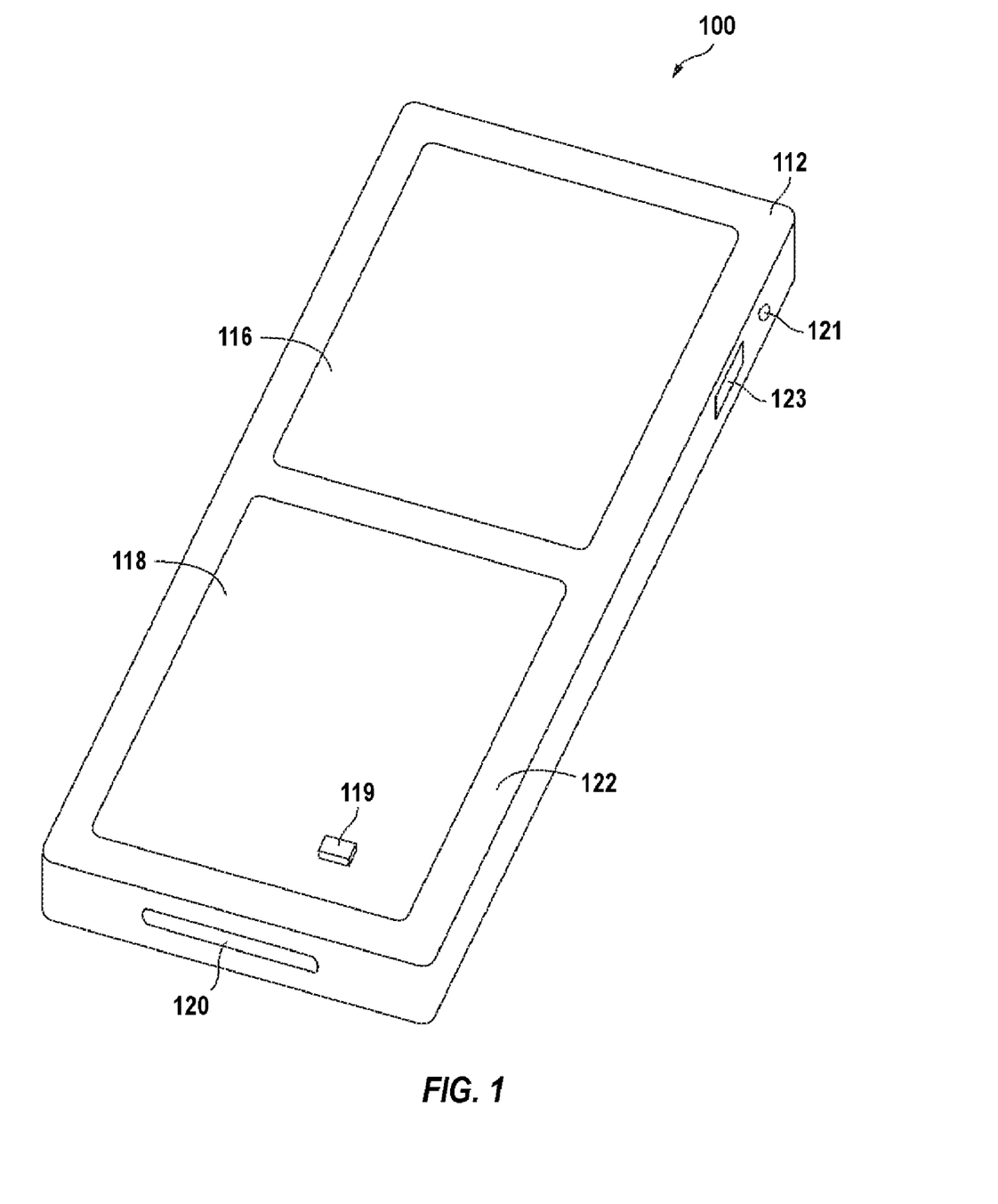
FIG. 1 is a perspective view of a wireless handheld device in accordance with an embodiment of the invention.

An illustrative wireless portable device in accordance with an embodiment of the invention is shown in FIG. 1. Portable devices may be small portable computers such as those sometimes referred to as ultra-portables. Portable devices may also be somewhat smaller devices. Examples of smaller portable devices include wrist-watch devices, pendant devices, headphone and earpiece devices, and other wearable and miniature devices. One category of portable devices is handheld devices. The invention is described in the context of wireless handheld devices, however the invention may be implemented in any suitable wireless portable device.

Wireless handheld devices may be, for example, cellular telephones, media players with wireless communications capabilities, handheld computers (also sometimes called personal digital assistants) with wireless capabilities, remote controllers, global positioning system (GPS) devices, and wireless handheld gaming devices. The Wireless handheld devices in accordance with the invention may also be hybrid devices that combine the functionality of multiple conventional devices. Examples of hybrid handheld devices include a cellular telephone that includes media player functionality, a gaming device that includes a wireless communications capability, a cellular telephone that includes game and email functions, and a wireless handheld device that receives email, supports mobile telephone calls, and supports web browsing. These are merely illustrative examples. Device 100 may be any suitable wireless portable or handheld electronic device.

Wireless handheld device 100 includes housing 112 and includes at least one antenna (not shown). Housing 112, which is sometimes referred to as a case, may be formed of any suitable materials including, plastic, wood, glass, ceramics, metal, or other suitable materials, or a combination of these materials. In some embodiments, housing 112 may be a dielectric or other low-conductivity material, so that the operation of conductive antenna elements that are located in proximity to housing 112 is not disrupted. In other embodiments, housing 112 may be formed from metal elements that serve as antenna elements.

The antenna(s) in device 100 may have a ground element (sometimes called a ground) and a resonant element (sometimes called a radiating element or antenna feed element). Antenna terminals, which are sometimes referred to as the antenna's ground and feed terminals, are electrically connected to the antenna's ground and resonant element, respectively.

Wireless handheld device 100 may have input-output devices such as a display screen 116, buttons such as button 123, user input control devices 118 such as button 119, and input-output components such as port 120 and input-output jack 121. Display screen 116 may be, for example, a liquid crystal display (LCD), an organic light-emitting diode (OLED) display, a plasma display, or multiple displays that use one or more different display technologies. As shown in the example of FIG. 1, display screens such as display screen 116 can be mounted on front face 122 of handheld electronic device 100. If desired, displays such as display 116 can be mounted on the rear face of handheld electronic device 100, on a side of device 100, on a flip-up portion of device 100 that is attached to a main body portion of device 100 by for example a hinge, or using any other suitable mounting arrangement.

A user of handheld device 100 may supply input commands using user input interface 118. User input interface 118 may include buttons (e.g., alphanumeric keys, power on-off, power-on, power-off, and other specialized buttons), a touch pad, pointing stick, or other cursor control device, a touch screen (e.g., a touch screen implemented as part of screen 116), or any other suitable interface for controlling device 100. Although shown schematically as being formed on the top face 122 of handheld electronic device 100 in the example of FIG. 1, user input interface 118 may generally be formed on any suitable portion of handheld electronic device 100. For example, a button such as button 123 (which may be considered to be part of input interface 118) or other user interface control may be formed on the side of handheld electronic device 100. Buttons and other user interface controls can also be located on the top face, rear face, or other portion of device 100. If desired, device 100 can be controlled remotely (e.g., using an infrared remote control, a radio-frequency remote control such as a Bluetooth remote control). In one embodiment wherein device 100 has cellular phone capability, a speaker (not shown) and a microphone (not shown) are housed in appropriate locations inside housing 112.

Handheld device 100 may have ports such as bus connector 120 and jack 121 that allow device 100 to interface with external components. Typical ports include power jacks to recharge a battery within device 100 or to operate device 100 from a direct current (DC) power supply, data ports to exchange data with external components such as a personal computer or peripheral, audio-visual jacks to drive headphones, a monitor, or other external audio-video equipment. The functions of some or all of these devices and the internal circuitry of handheld electronic device can be controlled using input interface 118.

Figure 2:
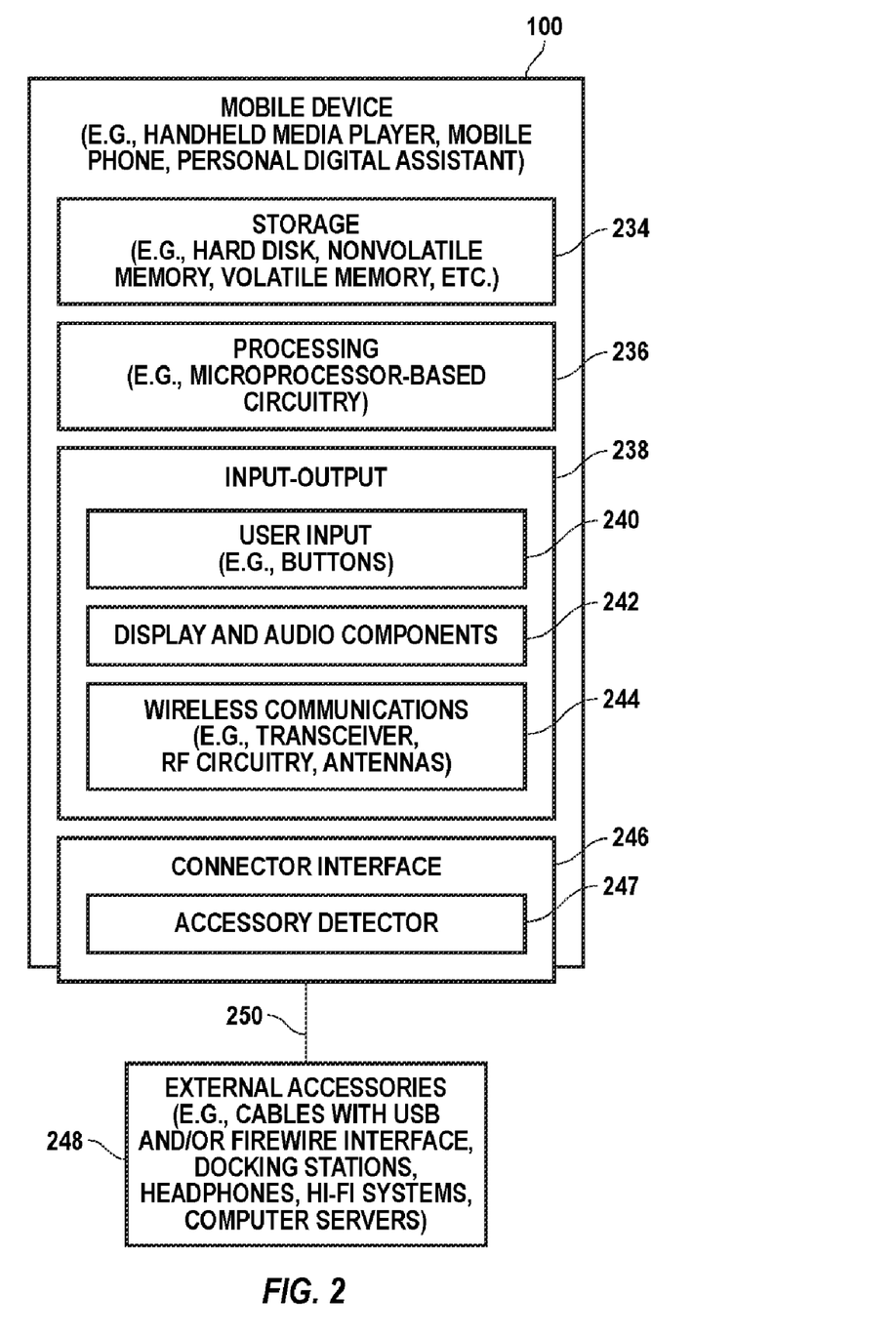
FIG. 2 is a schematic diagram of a wireless handheld device in accordance with an embodiment of the invention.

A schematic diagram of an illustrative wireless handheld device is shown in FIG. 2. Handheld device 100 may be a mobile telephone, a mobile telephone with media player capabilities, a handheld computer, a remote control, a game player, a global positioning system (GPS) device, a combination of such devices, or any other suitable portable electronic device.

As shown in FIG. 2, handheld device 100 includes storage 234 which in turn may include one or more different types of storage such as hard disk drive storage, nonvolatile semiconductor memory (e.g., NAND and/or NOR varieties of flash memory, EPROM, EEPROM and/or ROM), volatile memory (e.g., SRAM, DRAM, battery-backed SRAM and/or battery-backed DRAM). Processing circuitry 236 may be used to control the operation of device 100. Processing circuitry 236 may be based on a processor such as a microprocessor and/or a graphics processor and other suitable processor integrated circuits.

Input-output 238 may be used to allow data (e.g., text, video, audio) to be supplied to and from device 100. Display screen 116 and user input interface 118 of FIG. 1 are examples of input-output 238. Input-output 238 can include user input-output interface 240 such as buttons, touch screens, joysticks, click wheels, scrolling wheels, touch pads, key pads, keyboards, microphones, and cameras. A user can control the operation of device 100 by supplying commands through user input interface 240. Display and audio components 242 may include liquid-crystal display (LCD) screens, light-emitting diodes (LEDs), and other components that present visual information and status data. Display and audio components 242 may also include audio equipment such as microphone, speakers. Display and audio components 242 may contain audio-video interface equipment such as jacks and other connectors for external headphones, monitors and other equipment.

Wireless communications circuitry 244 may include communications circuitry such as radio-frequency (RF) transceiver circuitry formed from one or more integrated circuits, power amplifier circuitry, passive RF components, antennas (internal and/or external) and other circuitry for handling RF wireless signals. Wireless signals can also be sent using light (e.g., using infrared communications).

The wireless communications circuitry 244 may be used to cover communications frequency bands such as the cellular telephone bands at 850 MHz, 900 MHz, 1800 MHz, and 1900 MHz, the global positioning system (GPS) band at 1575 MHz, data service bands such as the 3G data communications band at 2170 MHz band (commonly referred to as UMTS or Universal Mobile Telecommunications System), the WiFi® (IEEE 802.11) band at 2.4 GHz, and the Bluetooth® band at 2.4 GHz. These are merely illustrative communications bands over which wireless communications circuitry 244 may operate. Additional bands are expected to be deployed in the future as new wireless services are made available. Wireless communications circuitry 244 may be configured to operate over any suitable band or bands to cover any existing or new wireless services of interest. If desired, multiple antennas may be provided in wireless communications circuitry 244 to cover more bands or one or more antennas may be provided with wide-bandwidth resonating element(s) to cover multiple communications bands of interest. An advantage of using a broadband antenna design that covers multiple communications bands of interest is that this type of approach makes it possible to reduce device complexity and cost and to minimize the volume within a handheld device that is allocated to antenna structures.

A broadband design may be used for one or more antennas in wireless communications circuitry 244 when it is desired to cover a relatively larger range of frequencies without providing numerous individual antennas or using a tunable antenna arrangement. If desired, a broadband antenna design may be made tunable to expand its bandwidth coverage or may be used in combination with additional antennas.

Figure 3:
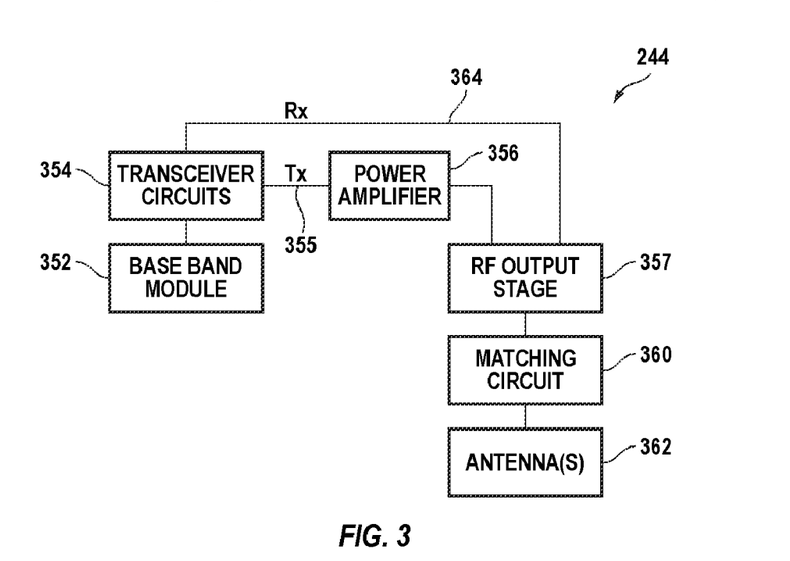
FIG. 3 shows a more detailed block diagram of the wireless communications block 244 in FIG. 2 in accordance with an exemplary embodiment of the invention.

FIG. 3 shows a more detailed block diagram of the wireless communications block 244 in FIG. 2 in accordance with an exemplary embodiment of the invention. Data signals that are to be transmitted by device 100 may be provided to baseband module 352 (e.g., from processing circuitry 236 of FIG. 2). Baseband module 352 may provide data to be transmitted to transmitter circuitry within transceiver circuit block 354. The transmitter circuitry may be coupled to power amplifier circuitry 356 via path 355.

During data transmission, power amplifier circuitry 356 may boost the output power of transmitted signals to a sufficiently high level to ensure adequate signal transmission. Radio-frequency (RF) output stage 357 may contain radio-frequency switches and passive elements such as duplexers and diplexers. The switches in the RF output stage 357 may be used to switch handheld device 244 between a transmitting mode and a receiving mode. Duplexer and diplexer circuits and other passive components in RF output stage may be used to route input and output signals based on their frequency.

Matching circuit 360 may include a network of passive components such as resistors, inductors, and capacitors and ensures that antenna 362 (which may be a broadband antenna) is impedance matched to the rest of the circuitry. Wireless signals that are received by antenna 362 are passed to receiver circuitry in transceiver circuitry 354 over a path such as path 364.

Referring back to FIG. 2, handheld device 100 contains connector interface 246 which may include I/O port 120 (FIG. 1). Connector interface 246 enables users to couple handheld device 100 with one or more external accessories 248 through one or more connection links 250. External accessories 246 may include various types of cables such as USB and FireWire cables, headphones (e.g., wired cellular headsets and audio headphones) audio-video equipment (e.g., speakers, Hi-Fi systems with integrated docking station, a game controller, or other equipment that receives and plays audio and video content), and stand-alone docking stations. In one embodiment, connector interface 246 includes a unitary multi-functional 30 pin connector with the pin assignment and function as outlined in the table in FIG. 6. This connector which advantageously makes handheld device 100 compatible with different types of interfaces, such as the USB and FireWires interfaces, is described more fully in application Ser. No. 11/519,541, filed Sep. 11, 2006, which disclosure is incorporated herein by reference in its entirety. The physical characteristics of an exemplary unitary multi-functional connector and a corresponding mating connector are described in U.S. Pat. No. 6,776,660 entitled "CONNECTOR," issued Aug. 17, 2004, which disclosure is incorporated herein by reference in its entirety.

Connector interface 246 includes an accessory detector 247 which detects an external accessory when coupled with the handheld device. In one embodiment, if accessory detector 247 detects that an external accessory coupled to handheld device 100 may interfere with the wireless operation of the handheld device, the user is alerted accordingly. For example, a message may be displayed on the display of the handheld device or an audio alert may be generated by the handheld device alerting the user of the potential interference with the wireless operation of the handheld device. In another embodiment, when accessory detector 247 detects an external accessory coupled to the handheld device interferes with the radio performance of the handheld device, accessory detector 247 adjusts a radio characteristic of the handheld device (e.g., by changing the gain of the power amplifier and/or the antenna gain). These embodiments will be described in more detail using the flow charts in FIGS. 4 and 5.

Figure 4:
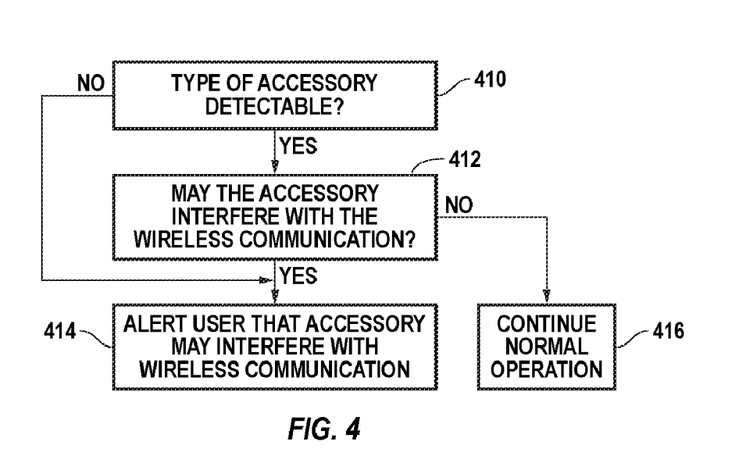
FIG. 4 shows a flow chart depicting a technique for detecting an external accessory to minimize interference with the wireless communication with the handheld device, in accordance with an embodiment of the invention.

In FIG. 4, at step 410, upon coupling an external accessory to wireless mobile device 100, accessory detector 247 attempts to detect what type of accessory is coupled. In one embodiment, a lookup table in which various known types of accessories are identified is stored in storage component 234 or in a memory device local to accessory detector 247. The lookup table may include a listing of accessories that are known to cause interference, and/or a listing of accessories that are known not to cause interference with the device radio performance. Upon detecting the type of external accessory that is coupled to the handheld device, the entries of the lookup table are checked to determine whether a match is found. If a match is not found, the external accessory is deemed undetectable, and the user is alerted that the accessory can not be recognized and it may interfere with the radio performance of the handheld device.

If a match is found in the listing of accessories known to cause interference, the user is alerted as such, as indicated in step 414. If a match is found in the listing of accessories known not to cause interference, normal device operation is continued, as indicated in step 416. The lookup table may be implemented in hardware, software or both. As indicated above, the user alerts may be provided via the display of the handheld device or an audio alert. Alternatively, the alert may be sent to an external device (e.g., a monitor) with which the handheld device is in wireless or wired communication. Also, the handheld device may be configured, using known techniques, to enable the user to update the lists in the lookup table (or enable automatic web-based updates of the lists) as new accessories are introduced.

Any one of a number of well-known techniques may be used for detecting an accessory that is coupled to the handheld device. For example, the well known loop back technique where two pins on the external accessory are shorted together may be used. Alternatively, the well known resistor detect technique may be used where a variable resistor connected between two pins of the external accessory is detected using for example an analog-to-digital converter. Yet another example is using a micro-switch (a make-or-break switch integrated into the connector of the handheld device) which would allow the handheld device to determine when an accessory is connected. Any combination of the above detection techniques may be used to detect the type of accessory that is coupled to the hand-held device.

In one embodiment, an authentication technique is used where both the accessory and the handheld device are equipped with microcontrollers that enable communication between the accessory and the handheld device. Any one of the various authentication and cryptographic techniques described in the above-referenced application Ser. No. 11/051,499, titled "Accessory Authentication for Electronic Devices," may advantageously be used to enable a more efficient and flexible detection of an accessory.

Figure 5:
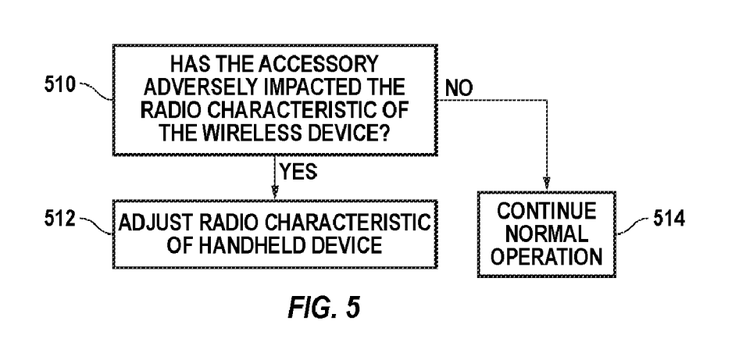
FIG. 5 shows a flow chart depicting another technique for detecting an external accessory to minimize interference with the wireless communication with the handheld device, in accordance with another embodiment of the invention.

In the embodiment depicted by FIG. 5, at step 510, upon coupling an external accessory to wireless mobile device 100, accessory detector 247 determines whether an external accessory coupled to the handheld device has caused interference with the radio performance of the handheld device (e.g., has caused detuning of the antenna and/or shifted the operating radio frequency outside the desired frequency range). If accessory detector 247 detects that the external accessory has caused interference with the radio performance, a radio characteristic of the wireless device is adjusted (e.g., the antenna 362 is retuned and/or a gain of the power amplifier 356 is adjusted) to reestablish proper wireless operation of the device, as indicated in step 512. If the accessory has not caused any interference with the radio performance of the device, normal device operation continues as indicated by step 514.

Any one of a number of well known techniques may be used for monitoring and detecting when the antenna is detuned, and for re-tuning the antenna as needed. Also, any one of a number of well known techniques may be used for monitoring and detecting when the operating frequency of the handheld device shifts out of the proper frequency range, and for shifting the frequency operation back in the proper frequency range.

The two techniques depicted by FIGS. 4 and 5 may be combined if desired. For example, in FIG. 5, if after detecting that the antenna has detuned or the operating frequency has shifted out of range, the handheld device is incapable of retuning the antenna or shifting the operating frequency back to the proper operating range, the handheld device may alert the user that the external accessory interferes with the RF performance of the handheld device.

The foregoing is merely illustrative of the principles of this invention and various modifications can be made by those skilled in the art in view of this disclosure without departing from the scope and spirit of the invention.

What is claimed is:

1. A handheld device comprising:
one or more antennas configured to facilitate wireless communication;
a connector configured to couple with one or more external accessories; and
an accessory detector coupled to the connector, wherein the accessory detector is configured to determine, based on cryptographic information received from an external accessory coupled with the connector, an accessory type associated with the external accessory and is configured to determine whether the external accessory coupled to the connector may interfere with wireless communication with the handheld device based on the accessory type;
wherein the accessory detector is further configured to change a gain of a power amplifier of the handheld device when the accessory detector detects interference with wireless communication with the handheld device.

2. The handheld device of claim 1 wherein the handheld device is configured to alert a user if the accessory detector detects that an external accessory coupled with the connector may interfere with wireless communication with the handheld device.

3. The handheld device of claim 2 wherein the handheld device is configured to alert the user by displaying a corresponding message on a display or by generating an audio message corresponding to the alert.

4. The handheld device of claim 1 wherein the handheld device is configured such that if the accessory detector cannot recognize an external accessory coupled to the connector, the handheld device notifies the user that the external accessory may interfere with wireless communication with the handheld device.

5. The handheld device of claim 1 wherein the handheld device is configured such that if the accessory detector detects that an external accessory coupled to the connector would interfere with the wireless communication with the handheld device, the handheld device alerts a user of the same.

6. The handheld device of claim 1 wherein the connector and the one or more antennas are disposed at a base of the handheld device.

7. The handheld device of claim 1 wherein the handheld device is configured to adjust a radio characteristic of the handheld device if the accessory detector detects interference with wireless communication with the handheld device.

8. The handheld device of claim 1 wherein the handheld device is configured to tune the one or more antennas if the accessory detector detects interference with the operation of the one or more antennas.

9. The handheld device of claim 1 wherein the handheld device is configured to adjust an operating frequency of the handheld device if the accessory detector detects an operating frequency of the handheld device shifted out of a predetermined operating frequency range.

10. The handheld device of claim 1 wherein the connector is configured to facilitate docking of the handheld device in a docking system.

11. The handheld device of claim 1 further configured to store a list of accessories, wherein the accessory detector is further configured to compare a detected external accessory coupled to the connector with the list of accessories to determine if a match can be found.

12. The handheld device of claim 11 wherein the list of accessories includes those accessories that are known to cause interference with the wireless operation of the handheld device.

13. The handheld device of claim 11 wherein the list of accessories includes those accessories that are known not to cause interference with the wireless operation of the handheld device.

14. The handheld device of claim 11 wherein the handheld device is configured to enable the list of accessories to be updated.

15. The handheld device of claim 1 wherein the accessory detector is configured to detect accessories with USB and FireWire interfaces.

16. A mobile device comprising:
one or more antennas configured to facilitate wireless communication;
a connector configured to couple with one or more external accessories; and
an accessory detector coupled to the connector, wherein the accessory detector is configured to determine, based on cryptographic information received from an external accessory coupled with the connector, an accessory type associated with the external accessory, and wherein the accessory detector is configured to alert a user when the accessory detector detects that the external accessory may interfere with wireless communication with the mobile device as determined based on the accessory type;

wherein the accessory detector is further configured to change a gain of the one or more antennas upon the determination that the external accessory will interfere with wireless communication with the mobile device.

17. The mobile device of claim 16 wherein the mobile device is configured to alert the user by displaying a corresponding message on a display or by generating an audio message corresponding to the alert.

18. The mobile device of claim 16 wherein the mobile device is configured such that if the accessory detector cannot determine an accessory type based on an external accessory coupled to the connector, the mobile device notifies a user that the external accessory may interfere with wireless communication with the mobile device.

19. The mobile device of claim 16 wherein the mobile device is configured such that if the accessory detector determines that an external accessory coupled to the connector would interfere with the wireless communication with the mobile device, the mobile device alerts a user of the same.

20. The mobile device of claim 16 wherein the connector and the one or more antennas are disposed at a base of the mobile device.

21. The mobile device of claim 16 wherein the accessory detector is further configured to compare a detected external accessory coupled to the connector with a list of accessories that are known not to cause interference with the wireless operation of the mobile device to determine if a match can be found.

22. The mobile device of claim 16 wherein the accessory detector is further configured to compare the accessory type associated with the external accessory with a list of accessory types that are known to cause interference with the wireless operation of the mobile device to determine if a match can be found.

23. A mobile device comprising:
one or more antennas configured to facilitate wireless communication;
a connector configured to couple with one or more external accessories; and
an accessory detector coupled to the connector and configured to adjust a radio characteristic of the mobile device when the accessory detector determines, based on information encrypted according to a cryptographic scheme and received from an accessory coupled to the mobile device, that the accessory corresponds with an accessory type that is known to interfere with wireless communication with the mobile device;
wherein to adjust the radio characteristic, the accessory detector changes a gain of a power amplifier of the mobile device.

24. The mobile device of claim 23 wherein the mobile device is configured to tune the one or more antennas if the accessory detector determines that the accessory corresponds with an accessory type that is known to interfere with the operation of the one or more antennas.

25. The mobile device of claim 23 wherein the mobile device is configured to adjust an operating frequency of the mobile device if the accessory detector determines that the accessory corresponds with an accessory type that is known to interfere with an operating frequency of the mobile device shifted out of a predetermined operating frequency range.

26. The mobile device of claim 23 wherein the connector and the one or more antennas are disposed at a base of the mobile device.

27. A method of operation in a handheld device, comprising:
determining, based on information encrypted according to a cryptographic scheme and received from an external accessory coupled to the handheld device, an accessory type associated with the external accessory;
determining, based on the accessory type, whether the external accessory may interfere with wireless communication with the handheld device;
alerting a user when it is determined that the external accessory may interfere with wireless communication with the handheld device; and
changing a gain of a power amplifier of the handheld device to minimize or eliminate the interference.

28. The method of claim 27 wherein the user is alerted by displaying a message on a display of the handheld device.

29. The method of claim 27 wherein the user is alerted by generating an audio message.

30. The method of claim 27 further comprising:
in the event that the accessory type cannot be determined, alerting the user that the external accessory may interfere with wireless communication with the handheld device.

31. The method of claim 27 further comprising:
comparing the detected external accessory type with a list of external accessory types to determine if a match can be found.

32. The method of claim 31 wherein the list of accessory types includes accessory types that are known to cause interference with the wireless operation of the handheld device.

33. The method of claim 31 wherein the list of accessory types includes accessory types that are known not to cause interference with the wireless operation of the handheld device.

34. A method of operation in a handheld device, comprising:
determining, based on information encrypted according to a cryptographic scheme and received from an external accessory coupled to the handheld device, an accessory type associated with the external accessory;
determining, based on the accessory type, whether the external accessory may interfere with wireless communication with the handheld device; and
adjusting a radio characteristic of the handheld device when it is determined that the external accessory will interfere with wireless communication with the handheld device;
wherein adjusting the radio characteristic comprises changing a gain of one or more antennas of the handheld device.

35. The method of claim 34 further comprising:
tuning the one or more antennas in the handheld device if it is determined that the external accessory may interfere with the operation of the one or more antennas.

36. The method of claim 34 further comprising:
adjusting an operating frequency of the handheld device if an operating frequency of the handheld device is shifted out of a predetermined operating frequency range.

37. A handheld device comprising:
one or more antennas configured to facilitate wireless communication;
a connector configured to couple with one or more external accessories; and an accessory detector coupled to the connector, wherein the accessory detector is configured to determine, for an external accessory coupled to the connector, a device type class with which the accessory is associated; the determination being based on cryptographic information received from the external accessory, wherein the device type class is selected from the group comprising: a known accessory type that may interfere with wireless communication with the handheld device, a known accessory type that does not interfere with wireless communication with the handheld device, and an unknown accessory type;

wherein the accessory detector is configured to change a gain of a power amplifier associated with the handheld device when it is determined that the external accessory is of an accessory type that will cause interference with wireless communication of the handheld device.

\* \* \* \* \*